United States Patent Office 3,436,410
Patented Apr. 1, 1969

3,436,410
1,4 - BIS - (2' - SULFO - 4' - TERT - BUTYLANILINO)-5,8-DIHYDROXY-ANTHRAQUINONE
Claus Weinand, Leverkusen, Klaus von Oertzen, Cologne-Stammheim, and Walter Hohmann, Leverkusen, Germany, assignors to Farbenfabriken Bayer Aktiengesellschaft, Leverkusen, Germany, a German corporation
No Drawing. Filed Apr. 1, 1965, Ser. No. 444,839
Claims priority, application Germany, Apr. 9, 1964, F 42,565
Int. Cl. C09b 1/34
U.S. Cl. 260—373                                    1 Claim

ABSTRACT OF THE DISCLOSURE

A green dye having excellent fastness to washing and milling when dyed on wool, of the formula:

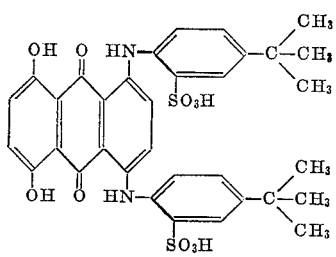

---

The present invention is concerned with a new anthraquinone dyestuff for wool and with the production thereof.

We have found that a new valuable green anthraquinone dyestuff for wool is obtained when 1 mol 1,4-dihydroxy-5,8-dichloro-anthraquinone is reacted with at least 2 mol p-tert-butylaniline in the presence of agents binding hydrochloric acid and the resultant 1,4-dihydroxy-5,8-di-(p-tert-butylanilino)-anthraquinone subsequently disulphonated.

The dyestuff according to the present invention has the following formula:

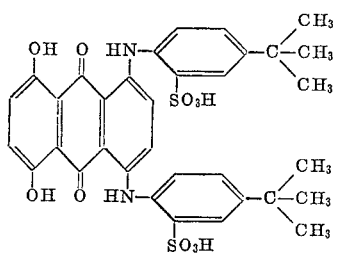

The reaction of dihydroxy-dichloro-anthraquinone with p-tert-butylaniline is expediently carried out with an excess of p-tert-butylaniline to ensure a satisfactory reaction. As agents binding hydrochloric acid there may be used the compounds usually employed for this purpose, such as sodium carbonate. The reaction is carried out in known manner, expediently at an elevated temperature, e.g. at temperatures between about 190 to 200° C., preferably about 160° to 185° C. Sulphonation is also performed in known manner, preferably in concentrated or $SO_3$ containing sulphuric acid, especially in concentrated sulphuric acid containing 5 to 20% of $SO_3$.

The dyestuff is obtained in a very pure form and has an excellent fastness to washing and milling. The dyestuff is used in the form of the free disulphonic acid for the dyeing of wool.

The following example is given for the purpose of illustrating the present invention:

Example (a) 3.5 kilograms 5,8-dichloro-quinizarin are introduced into 17.5 kg. p-tert-butylaniline, 1.4 kg. sodium carbonate are added, the reaction mixture is heated to 170 to 175° C. within the course of 30 minutes and kept at this temperature, while distilling off the water formed, until 5,8-dichloroquinizarin can no longer be detected in a sample.

The mixture is then stirred until it has cooled to 80° C. and slowly diluted at 80 to 60° C. with 17.5 litres methanol, suction-filtered at 60° C. and washed with hot methanol until the discharge has only a slight green colouration.

Yield: 4.35 kg. or 71% of theory; dark-blue hexagonal platelets.

(b) 2.5 kilograms of the product obtained according to (a) are dissolved in 7.75 litres 20% oleum and 5.05 litres 96% sulphuric acid and stirred at 35 to 40° C. until a sample gives a clear solution in hot dilute aqueous ammonia. The mixture is then diluted at 35° C. with 6.25 litres water, stirred until cold and further stirred at room temperature until no more precipitation occurs. The separated, coarsely crystalline disulphonated compound is filtered off, washed with some sulphuric acid (60° Bé.), pressed sharply, washed with dilute hydrochloric acid until free of sulphate and dried at 50 to 60° C. in a vacuum. The dyestuff obtained corresponds to the following formula:

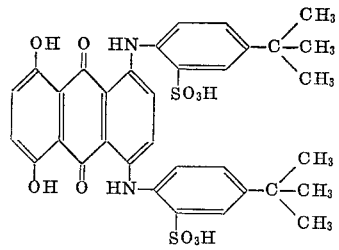

The disodium salt which can be precipitated from the free disulphonic acid in an acidic aqueous solution with sodium chloride, is less readily soluble than the free disulphonic acid.

What we claim is:
1. The compound of the formula:

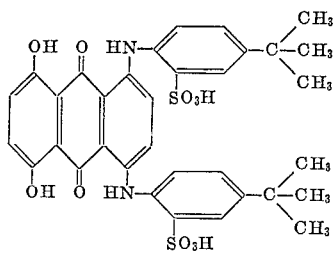

References Cited

UNITED STATES PATENTS

| | | | |
|---|---|---|---|
| 734,325 | 7/1903 | Hess | 260—373 |
| 2,490,703 | 1/1949 | Paige | 260—373 |
| 3,247,229 | 4/1966 | Singer et al. | 260—373 |

FOREIGN PATENTS 435,478  10/1926  Germany.

LORRAINE A. WEINBERGER, *Primary Examiner.*

H. C. WEGNER, *Assistant Examiner.*

U.S. Cl. X.R.

8—39